3,796,745
Patented Mar. 12, 1974

3,796,745
PROCESS FOR PREPARING LOWER CARBOXYLATE ESTERS OF BIS-(HYDROXYETHYL) TEREPHTHALATE
Charles N. Winnick, Teaneck, and Judd Posner, Hackensack, N.J., assignors to Halcon International, Inc.
No Drawing. Continuation-in-part of abandoned application Ser. No. 41,653, May 28, 1970. This application Apr. 30, 1971, Ser. No. 139,179
Int. Cl. C07c 69/82
U.S. Cl. 260—475 P    11 Claims

ABSTRACT OF THE DISCLOSURE

The present invention provides a process for the direct production of lower carboxylate esters of bis-(hydroxyether) terephthalate and of mixtures of such esters with the corresponding esters of mono-(hydroxyethyl) terephthalate involving the reaction of terephthalic acid with lower carboxylate esters of ethylene glycol.

CROSS REFERENCE TO RELATED APPLICATION

This application is a continuation-in-part of co-pending application, Ser. No. 41,653, filed May 28, 1970, now abandoned.

BACKGROUND OF THE INVENTION

Lower carboxylate esters of bis-(hydroxyethyl) terephthalate (more specifically bis-(beta-hydroxyethyl) terephthalate, i.e. bis-(acyloxyethyl) terephthalates) and mixtures of such esters with the corresponding lower carboxylate esters of mono-(beta-hydroxyethyl) terephthalate (more specifically mono-(beta-hydroxyethyl) terephthalate, i.e. mono-(acyloxyethyl) terephthalates) (which, mixtures, for convenience, will be referred to as "mono-bis mixtures") have great potential value in the production of polyesters. It is known, for example, as described in British 760,125 to prepared polyesters directly from the lower carboxylate esters of bis-(hydroxyethyl) terephthalate. However, in view of the substantially insoluble nature of terephthalic acid methods have not previously been devised for the production of these esters directly from terephthalic acid. Quite to the contrary, the methods employed by prior workers as reported in the above British patent specification and also as reported in U.S. Pat. No. 1,733,639, for preparing the lower esters of bis-(hydroxyethyl) terephthalate have first involved the production of bis-(hydroxyethyl) terephthalate and subsequently the reaction of this material with an acyl chloride. It is quite apparent that such prior procedures are difficult and time consuming and involve the use of expensive and exceedingly dangerous and corrosive chemical materials. The unavailability of a practical and straightforward procedure for making the lower carboxylate esters of bis-(hydroxyethyl) terephthalate has resulted in these materials being mainly laboratory curiosities without real and practical significance despite their announced utility as monomers for polyesters.

Methods, of course, have generally been known in the chemical art whereupon by an acidolysis reaction, esters have been reacted with an acid in order to create a new ester product. However, insofar as such procedures were previously employed, these procedures dealt with monofunctional materials which were readily soluble in a single phase reaction system. The di-functionality and the inherent insolubility characteristics of terephthalic acid have militated against application of acidolysis techniques to reactions involving terephthalic acid.

SUMMARY OF THE INVENTION

Now, in accordance with the present invention, a method has been devised for the direct production of lower carboxylate di-esters of bis-(hydroxyethyl) terephthalate and of mono-bis mixtures through direct reaction of lower esters of ethylene glycol with terephthalic acid. By the procedure of this invention, a simple, economic method is provided which results in the practical production of these lower esters so as to result in these lower esters becoming important and available materials of commerce.

DESCRIPTION OF THE INVENTION

In accordance with the present invention, terephthalic acid is reacted with lower carboxylate esters of ethylene glycol in the liquid phase at reaction temperatures between 100° C. and 350° C. When reaction temperatures are below 220° C., it is additionally necessary to employ an acidic catalyst; however, when employing reaction temperatures above this level, no catalyst is necessary and normally would not be employed although, of course, there is no essential process reason why such catalysts could not be used at any temperature within the operable range. By this procedure good selectivities to and high yields of the product dicarboxylate ester of bis-(hydroxyethyl) terephthalate or of the mono-bis mixture can be obtained.

The lower carboxylate di-esters of ethylene glycol can be employed as ester reactants but it has been discovered that mixtures of such di-esters with the corresponding ethylene glycol mono-esters, e.g. mixtures of ethylene glycol diacetate and ethylene glycol monoacetate are highly effective and provide a particularly smooth reaction. The dicarboxylate esters of ethylene glycol as commercially produced frequently contain some mono-ester and, in some cases, contain small amounts of ethylene glycol. In the practice of this invention such commercially-produced dicarboxylic esters of ethylene glycol can be used. Indeed, mixtures of mono- and di-esters containing up to 50 mol percent of the mono-ester are very suitably used, and even up to 80 mol percent are effectively employed, and a particularly useful mixture contains 10–30 mol percent of the mono-ester. In general, when mixtures are employed at least about 3 mol percent of the mono-ester is used. The ethylene glycol which may be present is ordinarily not objectionable but generally amounts greater than 25 mol percent are not desirable for economic reasons. When the ester of ethylene glycol reacts with the terephthalic acid, carboxylic acid is co-produced and the effectiveness and suitability of such ester mixtures is related to the postulated reaction:

mono-ester+carboxylic acid⇌di-ester+H$_2$O

Water will therefore be produced as a product in proportion to the mono-ester which reacts but it is readiy removed along with the liberated carboxylic acid. Thus, the term "carboxylate esters of ethylene glycol" is used herein to designate not only the di-esters along but also the di-esters in admixture with the corresponding mono-esters.

The lower carboxylate di-esters of bis-(hydroxyethyl) terephthalate and the lower carboxylate mono-esters of mono(hydroxyethyl) terephthalate as produced in accordance with the present invention have the following formulae:

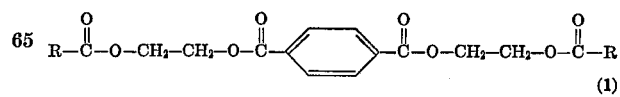

(1)

and

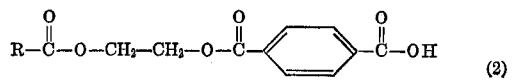

(2)

wherein R is hydrogen or an alkyl group having 1 to 3 carbon atoms.

By way of illustration, the reaction of the present invention takes place according to the following equation:

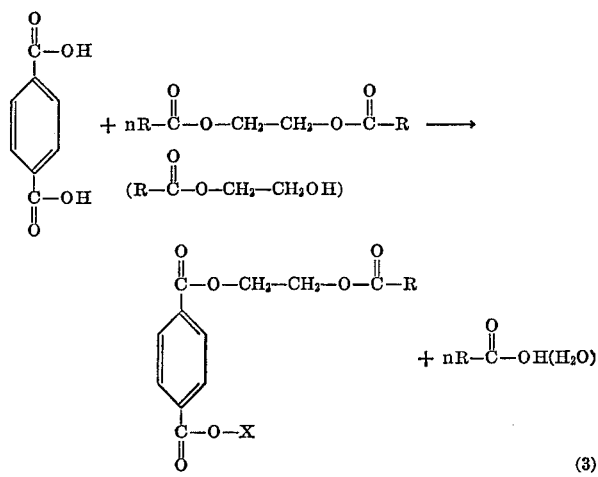

where R has the meaning above given, X is

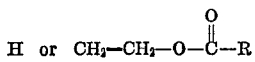

H or $CH_2$—$CH_2$—O—$\overset{\overset{O}{\|}}{C}$—R and $n$ is 1 to 2. When lower carboxylic acid is removed during the course of the reaction the product is mainly the bis-(beta-acyloxyethyl) terephthalate (Formula 1).

As will be apparent from the above equation, the ethylene glycol lower carboxylate ester reactant represents a material formed through esterification of ethylene glycol with a lower fatty acid having from 1 to 4 carbon atoms. The preferred acid is acetic acid, although formic acid, propionic acid, and butyric acid can be employed in the form of their esters with ethylene glycol.

Superficial examination of the foregoing chemical formulae and equations would lead one skilled in the art to expect that removal of the co-product lower carboxylic acid would be necessary to achieve satisfactory conversions (conversion meaning mols of terephthalate ester products formed per mol of terephthalic acid fed). Quite surprisingly, it has been found that such acid removal is not necessary since conversions greater than 90% are readily obtained even when no acid removal is employed. Of course, it is necessary at some stage to remove the acid co-product in order to recover concentrated carboxylate ester product but this can readily be done after completion of the reaction as well as during the reaction. Any co-product water which may be formed will ordinarily be removed along with the acid. Nonetheless, it should be pointed out that co-product acid removal during the reaction favors increased conversion to the dicarboxylate ester of bis-(hydroxyethyl) terephthalate and may also enhance reaction rate, but these are factors more important to economic optimization of the process than ones affecting process operation. When economics indicate that removal of co-product lower carboxylic acid during reaction is advantageous, this is most desirably accomplished by carrying out the reaction under conditions whereby formed lower carboxylic acid is vaporized and removed from the reaction zone as a vapor, leaving behind a reaction mixture containing mainly the di-ester of bis-(hydroxyethyl) terephthalate and unreacted carboxylate esters of ethylene glycol. Conversely, lower carboxylic acid, e.g. acetic acid, may be added to the reaction mixture in varying quantities, e.g. up to a molar quantity equal to 10 times the molar quantity of ethylene glycol esters fed to the system, and when carboxylic acid is added, molar quantities of 1 to 8 times the ester feed are preferably used. In this manner increased amounts of the mono-carboxylate ester of mono-(hydroxyethyl) terephthalate are formed.

As hereinabove indicated, the use of catalysts is not uniformly required for the conduct of the process of this invention. Whether or not a catalyst is to be employed depends primarily upon the reaction temperature used in this process. At reaction temperatures below 220° C. a catalyst is required and this catalyst is an acidic catalyst. At temperatures above about 220° C. catalysts are not required although, here too they may be used if so desired. When acidic catalysts are employed, either Bronsted or Lewis acids can be used. Illustrative of the Bronsted type acids are sulfuric acid, phosphoric acid, methanesulphonic acid, fluosulfonic acid, dihydroxyfluoboric acid, hydrochloric acid, toluenesulfonic acid, sulfonic acid-containing cation exchange resins and the like. Illustrative Lewis acids are boron trifluoride, aluminum trichloride, antimony pentafluoride, zinc chloride and the like. Such acids are well-known types and additional examples can be found, for example, in "Physical Organic Chemistry" by Jack Hine (1962—McGraw-Hill Company, New York) and in "Friedel-Crafts and Related Reactions" by George A. Olah, vol. 1 (1963—Interscience Publishers, New York). The volatile acids are considerably less desirable in the present system since these acids although catalyzing the reaction tend to distill overhead with the lower carboxylic acid causing separation problems and possibly also problems associated with the replenishment of the catalyst in the reaction zone. When a catalyst is used, its concentration can be varied over a wide range. Generally, concentrations by weight based on the total reaction mixture of 0.001% to 20% are illustrative with concentrations of 0.01 to 5% being preferred and concentrations of 0.1 to 2% being most advantageously employed in most cases.

The reaction in accordance with the present invention is a multi-phase type reaction. In view of the very limited solubility of terephthalic acid, the terephthalic acid is suspended in finely divided form in the reaction mixture during the reaction. Use of solvents is not preferred although inert solvents such as hydrocarbons, e.g. hexane, ethers, e.g. dioxane, sulfones, nitrated aryls and the like, can be employed. In addition, any of the liquid reactants, including the alkanoic acid, e.g. acetic acid, can serve as solvents or suspending media. Normally, it is preferred to suspend the terephthalic acid in finely divided form in a liquid body comprising the esters of ethylene glycol together with a catalyst, if used, as the reaction system. Either batch or continuous operations can be employed and of course during the progress of the reaction the reaction system will also contain product di-ester of bis-(hydroxyethyl) terephthalate or mono-bis mixtures, and the other co-produced terephthalic acid derivatives.

Suitable reaction conditions normally involve temperatures ranging from about 100° C. to about 350° C. Although temperatures outside this range can be employed, temperatures below 100° C. usually result in undesirably low reaction rates while temperatures above about 350° C. risk undesirable thermal decomposition. When catalysts are used, the preferred temperature range is 140° C. to 220° C. and the most desirable range is 175° C. to 200° C. When catalysts are not employed, temperatures from about 220° C. to 350° C. can be used with preferred temperatures being from about 230° C. to about 300° C. and temperatures from about 240° C. to about 275° C. being especially preferred. The pressure maintained on the reaction mixture is sufficient to maintain a liquid reaction mixture phase and, apart from this, is in no way critical. When co-product lower carboxylic acid is to be removed during the conduct of the reaction, the pressure is so regulated as to permit stripping off of lower aliphatic carboxylic acid co-product (e.g. acetic acid in the case where ethylene glycol di-acetate is employed as a reactant) as the reaction proceeds thereby enhancing rate and further increasing conversions while still maintaining the liquid reaction phase. Illustrative pressures range from about 5 to about 500 p.s.i.a. with pressures close to atmospheric, e.g., 14–50 p.s.i.a., being substantially preferred to enhance economy of equipment design. To facilitate such acid removal, it is frequently advantageous to employ an inert gas such as nitrogen, carbon dioxide, lower saturated hydrocarbon or the like to strip out the co-product lower aliphatic acid during the reaction.

The reaction times are, of course, a function of temperature and, when a catalyst is used, its type and concentration. Additionally, whenever co-product acid is removed, its rate of removal also affects reaction times. Reaction times for a particular practice of the invention can readily be determined by routine experimentation whereby skilled persons can ascertain the necessary time to reach the desired conversion. Illustrative reaction times range from about 10 minutes to about 24 hours with desirable time of 0.5 to 10 hours being most usually employed.

In carrying out the reaction of this invention, it is generally advisable to employ a molar excess of the lower carboxylate esters of ethylene glycol and, in any event, mol ratios of the glycol ester to terephthalic acid of at least 2/1 should be employed. The upper limit of the ratio of reactants depends merely upon practical considerations, with no significant benefit being achieved using ratios of the ethylene glycol esters to terephthalic acid in excess of about 30/1 although such higher ratios are quite operative. The desirable mol ratio is 2.5 to 20 mols, e.g. 4 to 20 mols, of glycol ester per mol of terephthalic acid with the most preferred range of reactants being 3 to 15 mols, especially 5 to 10 mols, of ethylene glycol esters per mol of terephthalic acid. At the lower ratios of ethylene glycol esters to terephthalic acids, e.g. in the range of from 2/1 to 4/1 or even higher, oligomers are formed along with the monomeric di-ester of bis-hydroxyethyl) terephthalate and the mono-ester of mono-(hydroxyethyl) terephthalate. These oligomers are represented by the formula:

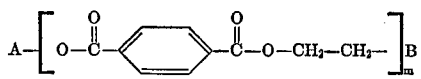

wherein A is

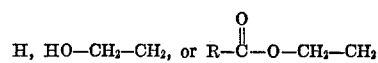

and wherein B is

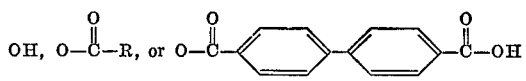

and where R is as above indicated and $m$ is an integer of 2 to 10. The oligomers can also be converted to high molecular weight polymers and their formation along with the formation of monomer is contemplated within the scope of this invention. It should generally be noted that the higher the ratio of ethylene glycol esters to terephthalic acid, the lower will be the amount of oligomer formed and also, the lower will be the average value of $m$ in the above presented structural formula of the oligomer formed.

Through practice of the present invention, quite surprisingly a direct method for the production of lower diesters of bis-(hydroxyethyl) terephthalate and of mono-bis mixtures is provided using terephthalic acid as a reactant. High selectivities and good reaction rates have been obtained even though the system is heterogeneous in that both liquid and solid reagents are involved. It is quite surprising that good yields are readily achieved in spite of the difunctionality of the acid and the heterogeneous nature of the system. The invention is further illustrated although not limited by the following examples of the invention.

EXAMPLE I

A charge of 250 grams of ethylene glycol diacetate is charged to a reaction flask equipped with an agitator, heating mantle and distillation column. One gram of sulfuric acid catalyst is added to the glycol diacetate and 22 grams of finely divided terephthalic acid is suspended therein. The mixture is heated at atmospheric pressure to reflux (190° C.) and acetic acid is distilled overhead and removed as by-product. After a reaction time of 8 hours, the evolution of acetic acid ceases at which point the terephthalic acid is completely in solution in the reaction product mixture. The reaction mixture solution is cooled and washed with aqueous sodium bicarbonate in order to separate acid materials contained therein. The washed reaction mixture is flash distilled in order to remove the excess ethylene glycol diacetate overhead at up to 125° C. pot temperature at 1.5 mm. Hg. The distillation residue is cooled to 25° C. and the product bis-(beta-acetoxyethyl) terephthalate in amount of 44 grams is recovered.

EXAMPLE II

Example I is repeated in all respects except that the 250 grams of ethylene glycol diacetate is replaced by 250 grams of a mixture of 90 mol percent of ethylene glycol diacetate and 10 mol percent of ethylene glycol monoacetate. Substantially the same amount of product bis-(beta-acetoxyethyl) terephthalate is recovered.

EXAMPLE III

Example 1 is repeated substituting ethylene glycol diformate for glycol diacetate. The reaction is carried out at the boiling point of the solution, 175° C., and completed in 6 hours after which time no more formic acid is evolved. The product is neutralized as above and flash distilled to a pot temperature of 120° C. at 2 mm. Hg. The product bis-(beta-formyloxyethyl) terephthalate is recovered in amount of 40 grams.

EXAMPLE IV

Example I is repeated substituting ethylene glycol dipropionate for the ethylene glycol diacetate. The reaction is carried out at the boiling point of the solution, 215° C., and completed in 14 hours time after which no more propionic acid is evolved. The product is neutralized as above described and flash distilled to a pot temperature of 130° C. at 1 mm. Hg. The product bis-(beta-propionyloxyethyl) terephthalate is recovered in amount of 48 grams.

EXAMPLE V

Example I is repeated with two grams of methanesulfonic acid in place of sulfuric acid. The reaction requires 16 hours to achieve completion and substantially the same product yield is obtained.

EXAMPLE VI

Example I is repeated using 2 grams of phosphoric acid in place of the sulfuric acid. After 8 hours the reaction is about 50% complete as determined by the acetic acid removed overhead. The reaction mixture is cooled and filtered to remove unreacted terephthalic acid. The resulting liquid product mixture is distilled as described in Example I and the product yield in amount of 20 grams is recovered.

EXAMPLE VII

Example I is repeated except that 6 grams of $BF_3$ (in the form of its complex with diethyl ether) is used in place of sulfuric acid. The reaction is complete in two hours and after treatment as described in Example I, 43 grams of product are obtained.

EXAMPLE VIII

A charge mixture is prepared containing ethylene glycol diacetate with sufficient finely divided terephthalic acid suspended therein to provide a slurry having an overall molar ratio of diacetate to terephthalic acid of 5:1. This mixture is charged to a sealed glass-lined autoclave and quickly heated to 250° C., held at this temperature for 1.5 hours and then cooled. The contents of the autoclave in the form of a homogeneous solution are then analyzed. Despite the absence of catalyst and of any removal of acetic acid during the reaction, conversion of terephthalic acid to a mixture of mono- and bis-(beta-acetoxyethyl) terephthalate and oligomers is in excess of 98% while the selectivity to these monomeric esters is over 96%.

EXAMPLE IX

Example VIII is repeated in all respects except that the feed is a mixture of 60 mol of ethylene glycol diacetate and 40 mol of monoacetate. The conversion and selectivity to terephthalates is substantially the same as those obtained in Example VIII.

EXAMPLE X

A series of runs is carried out employing the procedure and apparatus of Example VIII but at different reaction temperatures and reaction times. Results obtained are given in the following table.

| Run number | Reaction temp., °C. | Time, minutes | Percent Conversion | Percent Selectivity |
|---|---|---|---|---|
| 1 | 220 | 180 | 2 | 98+ |
| 2 | 230 | 180 | 38 | 98+ |
| 3 | 240 | 180 | 98–100 | 98+ |
| 4 | 250 | 90 | 98–100 | 98+ |
| 5 | 270 | 25 | 98 | 98+ |
| 6 | 270 | 60 | 98 | 98+ |
| 7 | 270 | 300 | 98 | 98+ |
| 8 | 300 | 10 | 98 | 98+ |
| 9 | 320 | 10 | 98 | 97 |
| 10 | 350 | 10 | 98 | 95 |

In the foregoing table, conversion is based upon disappearance of terephthalic acid, i.e., conversion is the quotient obtained (expressed as a percentage) by subtracting the amount of terephthalic acid in the product from that in the feed and dividing this difference by the terephthalic acid in the feed. The selectivity is the mols of terephthalates and their equivalent of oligomers in the product divided by the amount of terephthalic acid reacting. The results of the above table indicate that, without a catalyst and without acetic acid removal, as temperature increases slightly, conversion increases sharply (runs 1, 2 and 3). Runs 5, 6, and 7 demonstrate that reaction time is not critical and has but minimal effect on either conversion or selectivity; however, it should be noted that the product of Run 7 is somewhat darker in color than that of run 5, indicating that unnecessarily long reaction times tend to lead to product degradation, presumably the result of decomposition. The trend shown in runs 5, 6 and 7 is borne out by runs 9 and 10 which, while they both indicate extremely high conversion, also show slight decreases in selectivity and display somewhat darker product colors indicative of further and accelerating thermal decomposition.

EXAMPLE XI

Example VIII is repeated but acetic acid is removed. Reaction time is only 1 hour but otherwise the results obtained are similar. This example indicates an improvement in reaction rate obtained when the lower carboxylic acid co-product is removed as the reaction proceeds.

EXAMPLE XII

Example VIII is repeated in several runs employing, instead of ethylene glycol diacetate, molar equivalent amounts of the diformate, the dipropionate and the dibutyrate esters of ethylene glycol. In each case results substantially similar to those of Example VIII are obtained.

EXAMPLE XIII

Example VIII is repeated employing varying molar ratios of ethylene glycol diacetate to terephthalic acid. Results are expressed in the following table in which the term "ratio" refers to the molar ratio of ethylene glycol diacetate to terephthalic acid, the term "ME" refers to the mixture of bis-(beta-acetoxyethyl) terephthalate and mono-beta-acetoxyethyl) terephthalate and the term "oligomers" refers to oligomers of ME.

| Run number | Ratio | Conversion, percent | Selectivity, percent To ME | Selectivity, percent To oligomers |
|---|---|---|---|---|
| 1 | 4 | 99 | 60 | 40 |
| 2 | 5 | 99 | 65 | 35 |
| 3 | 7 | 99 | 75 | 25 |
| 4 | 10 | 99 | 85 | 15 |
| 5 | 20 | 99 | 93 | 7 |
| 6 | 50 | 99 | 98 | 2 |

It will be noted from the foregoing table that increasing the molar ratio of diacetate to terephthalic acid from 4:1 to 10:1 sharply reduces the amount of oligomer made while further increases reduce the oligomer make only slightly. Increasing this ratio beyond 10:1 has only very slight effect on oligomer make.

EXAMPLE XIV

Example VIII is repeated in all respects except that to the charge mixture is added sufficient sulfuric acid to provide 0.5% by weight in the reaction charge. Conversions and selectivities comparable to those of Example VIII are obtained in only 0.75 hour. Product color is somewhat darker than that of Example VIII.

EXAMPLE XV

Example VIII is repeated except that there is also included in the charge 8 mols of acetic acid per mol of ethylene glycol diacetate. The product terephthalate esters comprise 55 mol percent of mono-(beta-acetoxyethyl) terephthalate and 45 mol percent of bis-(beta-acetoxyethyl) terephthalate.

EXAMPLE XVI

To illustrate further the effect of added carboxylic acid, exemplified by acetic acid, as well as the effect of carboxylic acid removal during the reaction, upon the product distribution between mono-(acetoxyethyl) terephthalate (MAT) and bis-(acetoxyethyl) terephthalate (BAT), a series of runs is carried out with the following results. The basic feed comprises ethylene glycol diacetate and terephthalic acid in the mol ratio of 5:1.

| Acid added (mols per mol of terephthalic acid) | Acid removal | Monomeric product distribution, mol percent MAT | Monomeric product distribution, mol percent BAT |
|---|---|---|---|
| None | Yes | | 100 |
| Do | No | 30 | 70 |
| 4 | No | 45 | 55 |
| 8 | No | 55 | 45 |

What is claimed is:
1. The method for preparing a di-ester of bis-(beta-hydroethyl) terephthalate or mixtures of said di-ester with the corresponding mono-ester of mono-(beta-hydroxyethyl) terephthalate which comprises reacting terephthalic acid with from 4 to 20 mols. per mole of terephthalic acid, of a lower di-ester of ethylene glycol with acids of the formula R—COOH where R is H or alkyl of 1–3 carbon atoms or of a mixture of said lower di-ester with at least about 3 mol percent up to about 80 mol percent of the corresponding mono-ester of ethylene glycol with acids of the formula R—COOH where R is H or alkyl of 1–3 carbon atoms in the liquid phase at a reaction temperature of from about 100° C. to about 350° C. and, at reaction temperatures below about 220° C., in the presence of an acidic catalyst, controlled amounts of the acid of the formula R—COOH being maintained in the reaction zone when said mixtures of (beta-hydroxyethyl) terephthalate esters are produced, and recovering said di-ester of bis-(beta-hydroxyethyl) terephthalate or said mixtures of said di-ester with the corresponding mono-ester of mono-(beta-hydroxyethyl) terephthalate from the resulting reaction mixture.

2. The method of claim 1 wherein by-product lower aliphatic acid is removed during the reaction.

3. The method of claim 1 wherein the lower di-ester of ethylene glycol is ethylene glycol diacetate.

4. The method for preparing a di-ester of bis-(beta-hydroxyethyl) terephthalate or mixtures of said di-ester with the corresponding mono-ester of mono-(beta-hydroxyethyl) terephthalate which comprises reacting terephthalic acid with from 4 to 20 mols per mol of terephthalic acid of a mixture of a lower di-ester of ethylene glycol with acids of the formula R—COOH where R is H or alkyl of 1–3 carbon atoms with at least about 3 mol percent up to about 80 mol percent of the corresponding mono-ester of ethylene glycol with acids of the formula R—COOH where R is H or alkyl of 1–3 carbon atoms in in the liquid phase in the absence of a catalyst at a reaction temperature of from about 230° C., to about 350° C·, controlled amounts of the acid of the formula R—COOH being maintained in the reaction zone when said mixtures of (beta-hydroxyethyl) terephthalate esters are produced, and recovering said di-ester of bis-(beta-hydroxyethyl) terephthalate or said mixtures of said di-ester with the corresponding mono-ester of mono-(beta-hydroxyethyl) terephthalate from the resulting reaction mixture.

5. The method for preparing mixtures of a di-ester of bis-(beta-hydroxyethyl) terephthalate with the corresponding mono-ester of mono-(beta-hydroxyethyl) terephthalate with comprises reacting terephthalic acid with from 4 to 20 mols per mol of terephthalic acid, of a mixture of lower di-ester of ethylene glycol with acids of the formula R—COOH where R is H or alkyl of 1–3 carbon atoms with at least about 3 mol percent up to about 80 mol percent of the corresponding mono-ester of ethylene glycol with acids, of the formula R—COOH where R is H or alkyl of 1–3 carbon atoms in the liquid phase in the absence of a catalyst at a reaction temperature of from about 230° C. to about 350° C., controlled amounts of the acid of the formula R—COOH being maintained in the reaction zone, and recovering a mixture of said di-ester of bis-(beta-hydroxyethyl) terephthalate with the corresponding mono-ester of mono-(beta-hydroxyethyl) terephthalate from the resulting reaction mixture.

6. The method for preparing a di-acetate of bis-(beta-hydroxyethyl) terephthalate or mixtures of said di-acetate with the corresponding mono-acetate of mono-(beta-hydroxyethyl) terephthalate which comprises reacting terephthalic acid with a mixture of ethylene glycol di-acetate with at least about 3 mol percent up to about 80 mol percent of ethylene glycol mono-acetate in the liquid phase in the absence of a catalyst at a reaction temperature of from about 230° C. to about 350° C., the molar ratio of ethylene glycol acetate to terephthalic acid being 4/1 to 20/1, and controlled amounts of acetic acid being maintained in the reaction zone when said mixtures of (beta-hydroxyethyl) terephthalate acetates are produced, and recovering said di-ester of bis-(beta-hydroxyethyl) terephthalate or said mixtures of said di-ester with the corresponding mono-ester of mono-(beta-hydroxyethyl) terephthalate from the resulting reaction mixture.

7. The method for preparing mixtures of a di-acetate of bis-(beta-hydroxyethyl) terephthalate with the corresponding mono-acetate of mono-(beta-hydroxyethyl) terephthalate which comprises reacting terephthalic acid with a molar excess of a mixture of ethylene glycol di-acetate with at least about 3 mol percent up to about 80 mol percent of the corresponding ethylene glycol mono-acetate in the liquid phase in the absence of a catalyst at a reaction temperature of from about 230° C. to about 350° C., the molar ratio of ethylene glycol acetate to terephthalic acid being 4/1 to 20/1, and controlled amounts of acetic acid being maintained in the reaction zone, and recovering a mixture of said di-ester of bis-(beta-hydroxyethyl) terephthalate with the corresponding mono-ester of mono-beta-hydroxyethyl) terephthalate from the resulting reaction mixture.

8. The method of claim 4 wherein the ethylene glycol ester mixture contains about 10–30 mol percent of the mono-ester.

9. The method of claim 5 wherein the ethylene glycol ester mixture contains about 10–30 mol percent of the mono-ester.

10. The method of claim 6 wherein the ethylene glycol acetate mixture contains about 10–30 mol percent of the mono-acetate.

11. The method of claim 7 wherein the ethylene glycol acetate mixture contains about 10–30 mol percent of the mono-acetate.

References Cited
UNITED STATES PATENTS 2,856,375  10/1958  Mikeska _____ 260—475
3,413,336  11/1968  Hursmann et al. __ 260—475 PN

OTHER REFERENCES

Groggins: Unit Process in Organic Synthesis, p. 620 (1952).

LORRAINE A. WEINBERGER, Primary Examiner

E. J. SKELLY, Assistant Examiner